(12) United States Patent
Hogan et al.

(10) Patent No.: US 8,084,379 B2
(45) Date of Patent: Dec. 27, 2011

(54) WALL PANEL SYSTEM

(75) Inventors: Charles R. Hogan, Williamsville, NY (US); Erika Williams, Castle Rock, CO (US)

(73) Assignee: Johns Manville, Denver, CO (US)

( * ) Notice: Subject to any disclaimer, the term of this patent is extended or adjusted under 35 U.S.C. 154(b) by 490 days.

(21) Appl. No.: 12/283,692

(22) Filed: Sep. 15, 2008

(65) Prior Publication Data
US 2010/0064629 A1    Mar. 18, 2010

(51) Int. Cl.
*B32B 5/26* (2006.01)
*D04H 1/00* (2006.01)
*D04H 13/00* (2006.01)
*E04C 2/54* (2006.01)

(52) U.S. Cl. ............ 442/381; 442/414; 52/787.11; 52/745.19

(58) Field of Classification Search .......... 442/381, 442/414; 52/787.11, 745.19
See application file for complete search history.

(56) References Cited

U.S. PATENT DOCUMENTS

| | | | |
|---|---|---|---|
| 5,723,831 A * | 3/1998 | Martin et al. | 181/287 |
| 2002/0134616 A1 * | 9/2002 | Sheperd | 181/290 |
| 2004/0219853 A1 | 11/2004 | Weir et al. | |
| 2006/0204737 A1 * | 9/2006 | Ziegler | 428/219 |
| 2008/0120932 A1 | 5/2008 | Paradis | |

OTHER PUBLICATIONS

Johns Manville, Whispertone Wallboard Specifications.*

* cited by examiner

*Primary Examiner* — Norca L Torres Velazquez
(74) *Attorney, Agent, or Firm* — Robert D. Touslee

(57) ABSTRACT

A wall panel comprises a base layer comprising fiberglass board, an intermediate layer comprising molded fiberglass board, and a facer layer comprising glass textile. The wall panel provides consumers with greater options and flexibility in terms of room aesthetics as well as provides additional advantages over current basement finishing systems having fabric facer layers.

23 Claims, 1 Drawing Sheet

Figure
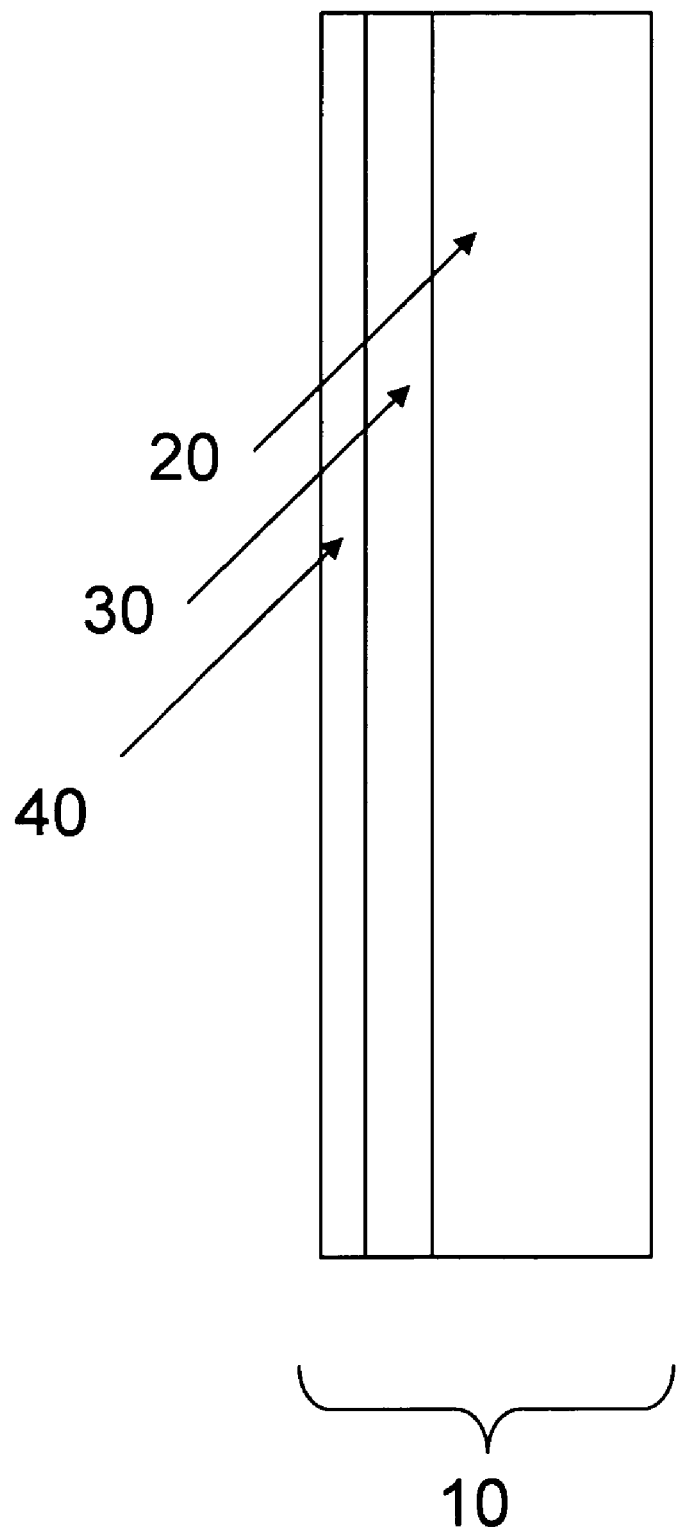

WALL PANEL SYSTEM

FIELD

The present disclosure relates to finished rooms and methods of finishing a room. More particularly, the present disclosure relates to finished rooms that include wall panels, and methods of finishing a room that include installing wall panels. The present disclosure has industrial applicability in the insulating and finishing of rooms, especially otherwise unfinished rooms, such as, for example, basements.

BACKGROUND

As used herein, the terms "finish", "finishing" and "finished" refer to the process of installing, and a room that has, a new wall surface. One example of a common method of finishing a room, such as a residential basement room having a cinder block wall, involves the attachment of wood studs roughly every 16 to 24 inches to the cinder block wall and the attachment of a wall surface such as drywall or paneling to the wood studs by attachment means such as nails or screws. Generally, insulation such as glass fiber insulation batts are placed between the wall and the wall surface before attachment of the wall surface to the wood studs, or a granular or loose-fill fibrous insulation is poured or blown in to the space between the wall and the wall surface after the wall surface is attached to the wood studs.

However, the above method, which is relatively time consuming to perform, is relatively costly for a contractor and thus a homeowner. Further, when a homeowner finishes a room such as a basement, i.e., in a do-it-yourself project, the homeowner often has limited experience performing the above method, and generally desires to spend as little as possible in materials to complete the project. The above method thus has the disadvantage that it requires a certain level of sophistication and ability with respect to building techniques.

Further, the attachment means common in such methods produce a finished wall structure that is relatively non-modular, i.e., in which it is very difficult to remove and then replace a wall panel in an aesthetically acceptable manner. Such modularity can be desirable to check for moisture behind the panel (especially in a new home), or to replace the panel with another panel such as a decorative panel or a mirror.

The above method has the additional disadvantage in that it results in a relatively hard, dense material such as drywall exposed to the room. Such material often is relatively reflective of acoustic energy at a wide midrange of frequencies, and the structure can thus have less desirable acoustics.

The Owens Corning Basement Finishing System™ addresses some of the disadvantages of the above method. However, the facer of the Owens Corning Basement Finishing System™, which faces an interior of the room being finished, is fabric (i.e., vinyl fabric). Many consumers find the fabric facer aesthetically unpleasing and consumers are unable to change the look of the fabric facer once installed. Accordingly, what is needed is a basement finishing system that provides consumers with greater options and flexibility in terms of room aesthetics as well as provides additional advantages over current basement finishing systems.

SUMMARY

Provided is a wall panel that comprises a base layer comprising fiberglass mat, an intermediate layer comprising molded fiberglass board, and a facer layer comprising glass textile.

Also provided is a method of forming a wall panel comprising bonding a facer layer comprising glass textile to an intermediate layer comprising molded fiberglass board and bonding the intermediate layer comprising molded fiberglass board to a base layer comprising fiberglass mat.

The wall panel provides consumers with greater options and flexibility in terms of room aesthetics as well as provides additional advantages over current basement finishing systems having fabric facer layers. In particular, the glass textile facer layer, in addition to being available in numerous textures, can be painted and repainted. Further, glass textiles are fire-resistant, allow moisture diffusion, and can be considered environmentally preferred products.

BRIEF DESCRIPTION OF THE DRAWINGS

The FIGURE depicts a cross-sectional view of the presently disclosed wall panel.

DETAILED DESCRIPTION

The presently disclosed room finishing system includes horizontal frame members, which may be attached to the wall, a plurality of wall panels, wherein each of the wall panels is located between at least two of the horizontal frame members, and a plurality of vertical frame members, wherein each of the vertical frame members includes a second, wherein each of the vertical frame members can be releasably connected to the horizontal frame members.

Accordingly, a method of finishing a room according to the present disclosure includes the steps of attaching horizontal frame members to a wall of the room, positioning wall panels between at least two of the horizontal frame members, and releasably connecting each of a plurality of vertical frame members to the horizontal frame members. Each of the vertical frame members includes at least one retaining arm and the releasably connecting step includes retaining at least a portion of one of the wall panels between each one of the retaining arms and the wall.

The frame members can be composed of a plastic material, such as polyethylene, polypropylene, polyvinyl chloride, or polystyrene, or could be composed of a metal material. The outer surfaces of the frame members can be treated in a manner well-known in the art such that they present a decorative finish.

The wall panels may run the height of the room being finished, and thus have a height of up to about 120 inches. The width of the wall panels may vary depending on the desired look of the room being finished but may have a width of, for example, up to about 72 inches. Alternatively, the wall panels may be of smaller size, for example, having a width of about 24 inches and a height of about 24 inches, and thus, may be "tiled" to cover a larger wall area.

As depicted in the FIGURE, the wall panels 10 of the room finishing system include fiberglass mat 20, molded fiberglass board 30, and a decorative glass textile 40 attached to an outer surface of each of the wall panels. The fiberglass mat 20, molded fiberglass board 30, and glass textile 40 of the presently disclosed wall panel 10 are bonded together by suitable binder, e.g., powdered hot melt adhesive. The wall panels can be used, for example, in basements of residential buildings. Moisture can pass through the wall panels and any water or water vapor at the basement wall can evaporate into the room interior.

The base layer of the wall panel comprises fiberglass board. An example of a suitable fiberglass board is Equipment Spin-Glas® Board or Whispertone® Wallboard, available from Johns Manville, Denver, Colo., which is a board manufactured from fine, rotary-process glass fibers bonded with a thermosetting resin. Equipment Spin-Glas Board and Whispertone Wallboard provides excellent thermal efficiency and acoustical performance. Because the glass fibers in the Equipment Spin-Glas Board and Whispertone Wallboard are relatively fine, they create a great number of minute air spaces, making the insulation highly effective for sound absorption and thermal properties. The glass fibers are resistant to the effects of moisture, oil, grease, and most acids. Because the fibers are highly resilient, they resist settling, breakdown, or sagging from vibration, and yield readily to impact and protect facings from puncture or tearing. The density of the fiberglass board base layer can be between about 1.0 and 6.0 pcf, for example, about 3.0-6.0 pcf or about 3.0 pcf, and the thickness of the fiberglass board base layer can be between about 1 and 3 inches, for example, about 1-2 inches or about 2 inches.

The intermediate layer of the wall panel comprises molded fiberglass board. Molded fiberglass board is made from highly resilient flame-attenuated glass fibers, which results in a durable, strong lightweight board. The density of the molded fiberglass board intermediate layer can be between about 3.0 and 20.0 pcf, for example, about 8.0-20.0 pcf or about 16.0 pcf, and the thickness of the molded fiberglass board intermediate layer can be between about 1/16 and 1 inch, for example, about 1/8 inch. The molded fiberglass board intermediate layer is relatively rigid or hard, especially as compared to the fiberglass board base layer, which allows the wall panels to be tackable, i.e., strong enough to hold the weight of a picture or other decorative hanging by means of one or more nails, pins, or tacks pushed into the panels and through the glass textile facer layer. Further, the relatively rigid or hard molded fiberglass board intermediate layer provides impact resistance to the wall panels.

The preferred facer layer of the wall panel comprises glass textile made from inorganic glass fibers. Glass textiles offer improved fire resistance over fabrics currently used in basement finishing systems as well as good abrasion resistance, durability, and appearance. In particular, the glass textiles can exhibit a Flame Spread Index (UL 723) of 10, a Smoke Development Index (UL 723) of 5, a Room Burn Test (NFPA 265/UBC 8-2) passing rating, and a High-temperature delamination test (UBC 8-2) passing rating.

For the Flame Spread and Smoke Development test method (ASTM E-84, UL 723, or NFPA 255), a material or system of materials is inserted into a long tunnel furnace. Inside the tunnel, a flame is introduced at one end of the sample, and a draft is introduced in order to ignite the test sample. During the progression of the test, the spread of flame along the sample is charted, along with the smoke measured at a receiver at the end of a tunnel. If the flame spreads for only a short distance along the surface of the material, and little smoke is generated, then the tested material receives a favorable flame-spread and smoke-development rating. The flame spread and smoke development test allows architects to select building materials and finishes that are relatively fire-resistant. The results of the test provide a pair of rating numbers, Flame Spread and Smoke Developed, that show relative performance of tested products in terms of flame and smoke. In most building codes, the most fire-resistant class of materials is Class 1 or Class A. To meet the Class A rating, the material must have a flame spread rating of 25 or less, and a smoke development index of 450 or less.

For the Room Burn Testing for Interior Finishes (Wallcoverings) test method (UBC 8-2 or NFPA 265), a full-sized test room with fixed dimensions has a finish applied to its interior walls. The walls are burned from a torch on the floor. Several observations are made as acceptance criteria during the test procedure: flames are observed, and must not spread beyond a given region of the wall; the temperature inside the room is monitored and must not exceed a fixed limit; and burning droplets capable of re-igniting a fire must not be formed. If the acceptance criteria are met, then the test material receives a "pass" rating. The room burn test has special significance for wallcoverings. If a wallcovering is tested and passes the room burn test, it can be installed on interior walls. Furthermore, a wallcovering that is Class A and passes the room burn test, is not required to be protected by an automatic sprinkler system. For Class A wallcoverings that do not pass the room burn test, the wallcovering must be protected by an automatic sprinkler system.

Glass textiles are not only available in various textures to match the preference of a consumer, but can also be painted and repainted according to the (color) preference of a consumer and/or to revitalize the appearance of an installed wall panel. Examples of suitable glass textiles include Scandatex® and Textra™ from Johns Manville. The glass textile can have a weight basis of about 75 to 200 $g/m^2$, for example, about 100-165 $g/m^2$ or about 110-150 $g/m^2$, a warp tensile strength of about 500-700 N/5 cm, for example, about 540-660 N/5 cm or about 600 N/5 cm, and a weft tensile strength of about 400-900 N/5 cm, for example, about 500-800 N/5 cm or about 580-700 N/5 cm.

The glass textiles are preferably of "open weave" design, used herein to mean they are specifically designed to allow moisture diffusion (i.e., the glass textiles are water vapor permeable), so the wall panels do not retain moisture and can dry to the inside and do not support mold or bacterial growth, even when outdoor humidity is high. When water vapor becomes liquid inside of a building, the risk of mold growth amplification becomes more pronounced. Warm air can hold more water vapor than cold air. When warm moist air cools below a specific temperature called the dew point, the air becomes saturated and can no longer hold the water in vapor form. The water vapor condenses, and becomes liquid water. During summer months in humid climates, moisture-laden air can enter an air-conditioned building and condense behind a non-permeable wall covering. The presence of liquid water can create a zone supporting bacteria and fungi potentially adversely affecting indoor air quality.

The glass textile can extend over the front and the top, bottom and side edges of the wall panel, and be fastened to the back of the wall panel. The glass textile may alternatively extend over the front of the wall panel and be fastened to the top, bottom and side edges thereof, or may simply be adhered over the entire front face of the molded fiberglass board intermediate layer.

Indoor air quality can be affected by many factors, including, for example, the products and materials used in building construction and/or decorating. In contrast to vinyl products that can emit volatile organic compounds (VOCs), the glass textiles emit particles, VOCs, and formaldehyde at such a low level that they can be considered environmentally preferred products.

The glass textiles and the fiber glass board can contribute to LEED (Leadership in Energy and Environmental Design) points. The LEED Green Building Rating System, developed by the U.S. Green Building Council, provides a suite of standards for environmentally sustainable construction. Further, the glass textiles can be certified under Oeko-Tex Standard 100, which is an international certification system for textiles that tests for harmful substances.

The presently disclosed wall panels provide thermal efficiency and acoustical performance benefits in an aesthetic room finishing system. In addition, the presently disclosed finishing system is easy to install and is nondestructively modular, i.e., it includes modular panels that can be removed and replaced quickly and easily in a nondestructive manner.

While various embodiments have been described, it is to be understood that variations and modifications may be resorted to as will be apparent to those skilled in the art. Such variations and modifications are to be considered within the purview and scope of the claims appended hereto.

What is claimed is:

1. A wall panel comprising:
   a base layer comprising fiberglass board;
   an intermediate layer comprising molded fiberglass board; and
   a facer layer comprising glass textile.
2. The wall panel of claim 1, wherein the base layer has a density between about 1.0 and 6.0 pcf.
3. The wall panel of claim 2, wherein the base layer has a density of about 3.0 pcf.
4. The wall panel of claim 1, wherein the base layer has a thickness between about 1 and 3 inches.
5. The wall panel of claim 4, wherein the base layer has a thickness of about 2 inches.
6. The wall panel of claim 1, wherein the intermediate layer has a density between about 3.0 and 20.0 pcf.
7. The wall panel of claim 6, wherein the intermediate layer has a density of about 16 pcf.
8. The wall panel of claim 1, wherein the intermediate layer has a thickness between about 1/16 and 1 inch.
9. The wall panel of claim 8, wherein the intermediate layer has a thickness of about 1/8 inch.
10. The wall panel of claim 1, wherein the glass textile has a weight basis of about 75 to 200 g/m$^2$.
11. The wall panel of claim 10, wherein the glass textile has a weight basis of about 110-150 g/m$^2$.
12. The wall panel of claim 1, wherein the glass textile has a warp tensile strength of about 500-700 N/5 cm and a weft tensile strength of about 400-900 N/5 cm.
13. The wall panel of claim 12, wherein the glass textile has a warp tensile strength of about 600 N/5 cm, and a weft tensile strength of about 580-700 N/5 cm.
14. The wall panel of claim 1, wherein the glass textile exhibits a Flame Spread Index (UL 723) of 25 or less, a Smoke Development Index (UL 723) of 450 or less, a Room Burn Test (NFPA 265/UBC 8-2) passing rating, and a High-temperature delamination test (UBC 8-2) passing rating.
15. The wall panel of claim 14, wherein the glass textile exhibits a Flame Spread Index of 10 and a Smoke Development Index of 5.
16. The wall panel of claim 1, wherein the base layer is bonded to the intermediate layer and the intermediate layer is bonded to the facer layer.
17. The wall panel of claim 1, wherein the wall panel has a width of up to 72" inches and a height of up to 120 inches.
18. The wall panel of claim 17, wherein the wall panel has a width of 24 inches and a height of 24 inches.
19. A method of forming a wall panel comprising:
    bonding a facer layer comprising glass textile to an intermediate layer comprising molded fiberglass board; and
    bonding the intermediate layer comprising molded fiberglass board to a base layer comprising fiberglass mat.
20. The wall panel of claim 1, wherein the molded fiberglass board of the intermediate layer comprises flame-attenuated glass fibers.
21. The wall panel of claim 20, where in the fiberglass board of the base layer comprises rotary-process glass fibers bonded with a thermosetting resin.
22. The wall panel of claim 1, wherein the molded fiberglass board of the intermediate layer is more rigid or hard than the fiberglass board of the base layer.
23. The wall panel of claim 21, wherein the rigidity or hardness of the molded fiberglass board of the intermediate layer allows the wall panel to be tackable.

* * * * *